United States Patent [19]

Ducassou

[11] Patent Number: 4,842,398

[45] Date of Patent: Jun. 27, 1989

[54] ULTRALIGHT-WEIGHT MIRROR AND METHOD OF MANUFACTURING IT

[75] Inventor: Didier Ducassou, Palaiseau, France

[73] Assignee: Societe de Fabrication D'Instruments de Mesure (S.F.I.M.), Massy Cedex, France

[21] Appl. No.: 139,287

[22] Filed: Dec. 29, 1987

[30] Foreign Application Priority Data

Dec. 30, 1986 [FR] France .................... 86 18339

[51] Int. Cl.$^4$ .................... G02B 5/08; B32B 3/12
[52] U.S. Cl. .................... 350/641; 428/105; 428/117; 428/912.2
[58] Field of Search .......... 350/600, 641; 428/105, 428/117, 912.2

[56] References Cited

U.S. PATENT DOCUMENTS

| 4,238,265 | 12/1980 | Deminet | 350/641 |
| 4,272,578 | 6/1981 | Schegerin | 428/117 |
| 4,464,429 | 8/1984 | Michaud-Soret | 428/117 |
| 4,508,425 | 4/1985 | Tanaka et al. | 350/641 |

FOREIGN PATENT DOCUMENTS 58-169102  10/1983  Japan .................... 350/641

Primary Examiner—Bruce Y. Arnold
Assistant Examiner—Martin Lerner

[57] ABSTRACT

The mirror comprises a cellular structure core having a stack of plies each constituted by fiber-containing polymerized resin fixed on at least one face thereof, with a reflecting surface being made on the stack, and with the fibers in each ply extending in one direction only. The invention enables ultralight-weight mirrors to be made having excellent mechanical properties.

29 Claims, 2 Drawing Sheets

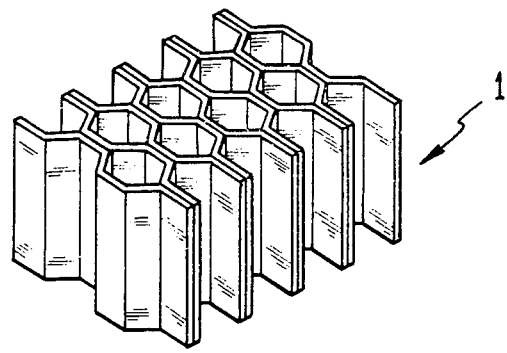
FIG_1
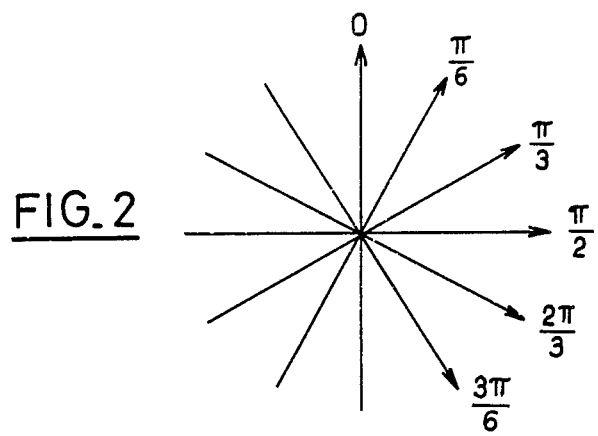
FIG_2
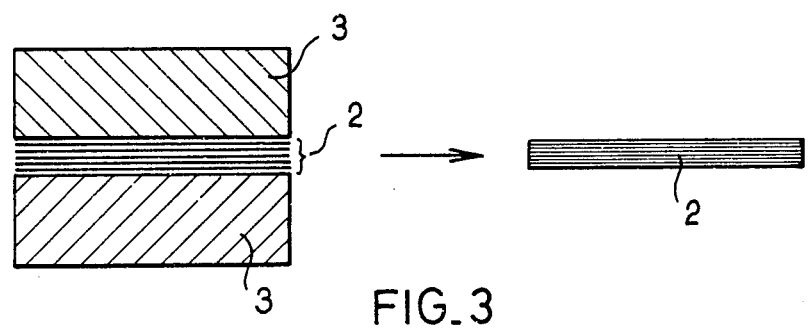
FIG_3

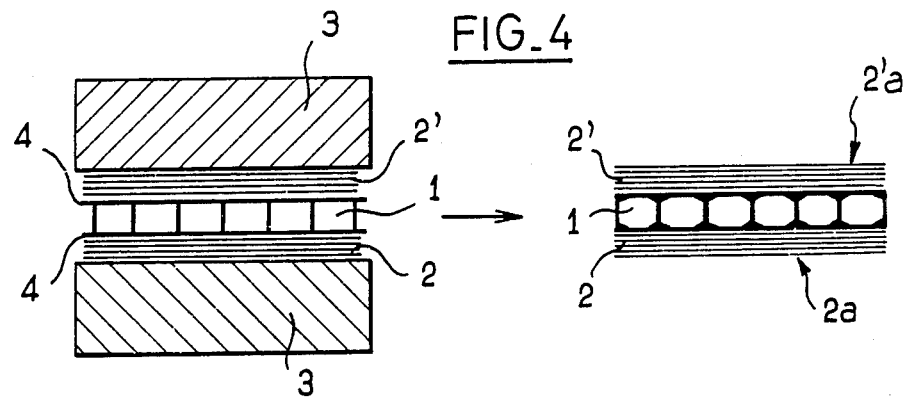
FIG._4
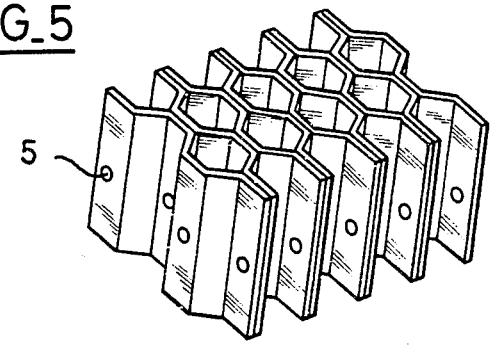
FIG._5
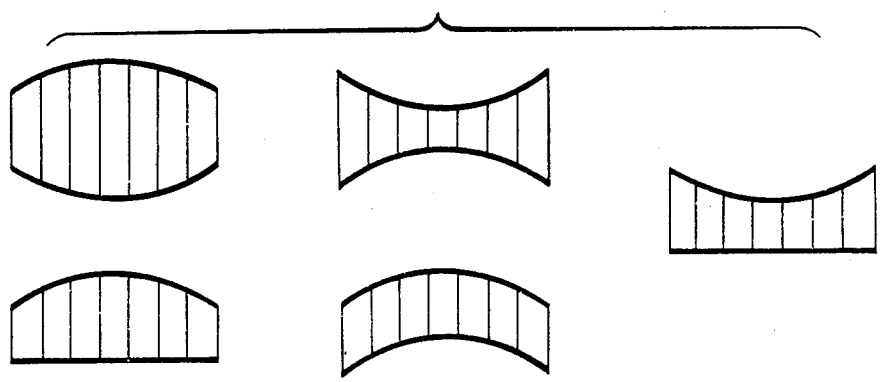
FIG._6

ULTRALIGHT-WEIGHT MIRROR AND METHOD OF MANUFACTURING IT

The invention relates to an ultralight-weight mirror and to a method of manufacturing it.

BACKGROUND OF THE INVENTION

One known way of manufacturing a light-weight mirror is to fix plates on a honeycomb core and to put a reflecting deposit on one of the plates (IBM Technical Disclosure Bulletin, Vol. 20, No. 12, May 1978, page 5121; U.S. Pat. No. 3,912,380).

It is also known that plastic materials and fibers may be used to make low mass mirrors or other optical components (Laser Focus, April 1985, pages 40 to 42; U.S. Pat. No. 4,463,055; French patent 2 215 631).

More precisely, French patent 2 215 631 describes a method of manufacturing a low mass optical component in which a stack is made of plies constituted by fibers impregnated with a polymerizable resin, with such a stack being applied and glued to at least one of two opposite faces of a core of cellular structure, with the resin being polymerized by heating and by applying pressure, and with a reflecting surface being formed on the stack.

A fundamental difficulty in the manufacture of a light-weight mirror lies in the fact that light weight is often obtained to the detriment of the mechanical properties of the mirror, and in particular of its stiffness.

It is thus very difficult to obtain a mirror which is simultaneously both light in weight and which has good mechanical properties.

The present invention seeks to provide an ultralight-weight mirror having improved mechanical qualities, in particular improved stiffness.

SUMMARY OF THE INVENTION

This is achieved, according to the invention, by a method in which a stack is made of plies constituted by fibers impregnated with polymerizable resin, one such stack being applied to at least one of two opposite faces of a cellular structure core, the resin being polymerized by heating while pressure is applied, and a reflecting surface being made on the stack, the method including the improvement whereby each ply is made in such a manner that the fibers of the ply extend in one direction only and in that said polymerization is performed prior to applying and fixing the stack on the cellular structure core.

The orientations of the fibers in various plies are preferably determined in such a manner as to increase the sheer modulus and the Young's modulus of the stack and/or in such a manner as to reduce the coefficient to expansion of the stack.

BRIEF DESCRIPTION OF THE DRAWINGS

An implementation of the invention is described by way of example with reference to the accompanying drawings, in which:

FIG. 1 is a diagrammatical perspective view of a cellular substrate for constituting the core of a mirror;

FIG. 2 is a theoretical diagram showing the orientations of the fibers in successive plies;

FIG. 3 is a diagram of a device used for polymerizing the stack of plies;

FIG. 4 is a diagram of a device used for gluing the stack onto the cellular substrate;

FIG. 5 is a diagrammatic perspective view of a modified substrate; and

FIG. 6 shows the mirror shapes that can be manufactured using the method of the invention.

MORE DETAILED DESCRIPTION

FIG. 1 shows a cellular structure 1 (preferably having hexagonal cells and of the type commonly referred to as a honeycomb) which is made of metal or of any other material suitable for obtaining adequate stiffness.

On each of the two opposite main faces of said structure, a stack 2 or 2' is fixed, said stack being made by stacking plies of high Young's modulus fibers (or any other fibrous material) with the plies being pre-impregnated with resin. The fibers in each ply are oriented in the same direction and the orientations of the fibers in different plies are selected so that the coefficient of expansion in the plane is as small as possible while its Young's modulus is as high as possible.

Preferably, the orientations of the fibers in the various plies are at angles of $K\pi/n$, where K takes all integer values from 0 to $(n-1)$ once, and once only, and n is the number of plies (FIG. 2).

In a preferred embodiment, the outside face of the stack is made of metallized fibers extending in a single direction and intended to act as an electrode.

Both stacks are polymerized between two parallel steel plates which are optically polished and treated with antiadhesive agents, within a press having exactly parallel heating plates 3 (see FIG. 3).

After the two stacks have completely polymerized, they are laminated onto the light-weight substrate using an adhesive film 4 (of the REDUX type sold by CIBA GEIGY) which is polymerizable in the press having hot plates 3 (see FIG. 4).

A metal coating is then made on the outside face of one of the stacks to a sufficient thickness to enable it to be polished until it has the desired degree of planeness.

The metal deposit may be performed electrolytically, particulary when one or both outside faces 2a and 2'a contain metallized fibers suitable for acting as electrodes.

In a variant, the metallization is performed chemically followed by an electrolytic deposit up to a thickness which is sufficient to receive polishing by any of the methods conventional in optics, with the face then being polished until it has the desired degree of planeness.

It is also possible to perform metallization by a vacuum deposition technique (e.g. magnetron cathode sputtering) until a sufficient thickness has been obtained for subsequently performing optical polishing to the desired degree of planeness.

The reflecting face may be provided directly by the polished metal deposit on the stack, or else by an additional metal coating, e.g. of silver, aluminum, or gold, e.g. made by vacuum evaporation onto the polished metal deposit in the event that it is not possible to obtain the desired reflection factor from the polished metal deposit itself.

Finally, if so desired, a protective deposit is provided of the kind conventionally used on optical surfaces (of the SiO, or the $MgF_2$, etc. type).

All of the metallization operations are performed in such a manner as to ensure that the temperature of the mirror does not exceed the limit temperatures for conserving the mechanical properties of the laminated materials.

In applications where pressure variations may occur, it may be necessary to use a cellular structure having cells that intercommunicate by means of holes 5 (see FIG. 5). These holes should be temporarily closed during metallization treatments.

The invention is not limited to using special fibers which are suitable for being metallized to constitute an electrode: although carbon fibers are preferably used, it is possible in variants to use other types of fiber, e.g. fibers made of Kevlar, glass, ceramics, pure silica, or boron.

The reflecting face may be subjected to a multilayer treatment.

I claim:

1. A method of manufacturing an ultralight weight mirror having good mechanical properties, in which a stack is made of plies constituted by fibers impregnated with a polymerizable resin, one such stack being applied at least to one of two opposite faces of a cellular structure core, the resin being polymerized by heating while pressure is applied and reflecting surfaces made on the stack, the method including the improvement whereby each ply is made in such a manner that the fibers of the ply extend in one direction only, wherein said polymerization is performed prior to applying and fixing the stack on the cellular structure core, and wherein the orientations of the fibers in the various plies are at angles respectively of $K\pi/n$ where K takes all integer values from 0 to $(n-1)$ once and once only, and wherein n is the number of plies, said reflecting surface being provided by applying a layer of metallization to the last ply of the stack, and wherein the fibers of said last ply are used as electrodes for laying a metal coating on the outside of the ply of the stack by electrolytic means.

2. The method according to claim 20 wherein the orientations of the fibers in the various plies are chosen in such a manner as to increase the shear modulus and Young's modulus of the stack.

3. The method according to claim 1 wherein the orientations of the fibers in the various plies are selected in such a manner as to reduce the coefficient of expansion of the stack.

4. The method according to claim 1 wherein the fibers are selected to be of high Young's modulus, such as fibers from the group consisting of carbon, Kevlar, glass, ceramics, silica and boron.

5. The method according to claim 1 wherein the stack is polymerized in a press having accurately parallel hot plates.

6. The method according to claim 1 wherein said reflecting surface is made by ion deposition of a metal.

7. The method according to claim 1 wherein the cellular structure is a honeycomb structure.

8. The method according to claim 1 wherein such stack is fixed on each of two opposite main faces of said cellular structure.

9. A method of manufacturing an ultralight-weight mirror having good mechanical properties, in which a stack is made of plies constituted by fibers impregnated with a polymerizable resin, one such stack being applied at least to one of two opposite faces of a cellular structure core, the resin being polymerized by heating while pressure is applied and reflecting surfaces being made on the stack, the method including the improvement whereby each ply is made in such a manner that the fibers of the ply extend in one direction only, wherein said polymerization is performed prior to applying and fixing the stack on the cellular structure core, and wherein the orientation in the fibers in the various plies are at angle respectively of $K\pi/n$, where K takes all integer values from 0 to $(n-1)$ once and once only, and wherein n is the number of plies, the stack polymerized in a press having accurately parallel hot plates.

10. The method according to claim 9 wherein a film of polymerizable adhesive is used to adhere the polymerizable stack onto the cellular structure, and wherein this adhesion step takes place in a hot plate press.

11. The method according to claim 9 wherein a metal coating is provided on the outside face of the stack, and said metal coating being polished.

12. The method according to claim 9 wherein said reflective surfaces achieved by applying a layer of metalization in the form of a polished metal coating.

13. The method according to claim 9 wherein said metal coating is made chemically.

14. The method according to claim 9 wherein the cellular structure is a honeycomb structure.

15. A method of manufacturing an ultra-light-weight mirror having good mechanical properties, in which a stack is made of plies constituted by fibers impregnated with a polymerizable resin, one such stack being applied at least to one of two opposite faces of a cellular structure core, the resin being polymerized by heating while pressure is applied and reflecting surfaces being made on the stack, the method including the improvement whereby each ply is made in such a manner that the fibers of the ply extend in one direction only, wherein said polymerization is performed prior to applying and fixing the stack on the cellular structure core, and wherein the orientation in the fibers in the various plies are at angle respectively of $K\pi/n$, where K takes all integer values from 0 to $(n-1)$ once and once only, and wherein n is the number of plies, wherein a film of polymerizable adhesive is used to adhere the polymerizable stack onto the cellular structure, and wherein this adhesion step takes place in a hot plate press.

16. A method of manufacturing an ultra-light-weight mirror having good mechanical properties, in which a stack is made of plies constituted by fibers impregnated with a polymerizable resin, one such stack being applied at least to one of two opposite faces of a cellular structure core, the resin being polymerized by heating while pressure is applied and reflecting surfaces being made on the stack, the method including the improvement whereby each ply is made in such a manner that the fibers of the ply extend in one direction only, wherein said polymerization is performed prior to applying and fixing the stack on the cellular structure core, and wherein the orientation in the fibers in the various plies are at angle respectively of $K\pi/n$, where K takes all integer values from 0 to $(n-1)$ once and once only, and wherein n is the number of plies, wherein such stack is fixed on each of two opposite main faces of said cellular structure.

17. The mirror according to claim 16 wherein the outermost ply of the stack contains metallized fibers.

18. The mirror according to claim 16 wherein the fibers are selected from the group constiting of carbon, Kevlar, glass, ceramics, silica and boron.

19. The method according to claim 16 wherein the orientations of the fibers in the various plies are chosen in such manners to increase the shear modulus and Young's modulus of the stack.

20. The method according to claim 16 wherein the orientations of the fibers in the various plies are selected in such a manner as to reduce the expansion coefficient of the stack.

21. The method according to claim 16 wherein the fibers are selected from the group consisting of carbon, Kevlar, glass, ceramics, silica, and boron.

22. The method according to claim 16 wherein the stack is polymerized in a press having accurately parallel hot plates.

23. The method according to claim 16 wherein a metal coating is provided on at least one of the outside faces of the stack, and that outside face with said coating being polished.

24. The method according to claim 16 wherein said reflecting surface comprises a layer of metallization applied to at least one outside face of said stack.

25. The method according to claim 16 wherein a metal coating is chemically provided on an outside face of the stack.

26. The method according to claim 16 wherein said reflecting surface is formed by ion deposition of a metal.

27. The method according to claim 16 wherein at least one outside ply of stack contains metallized fibers.

28. An ultralight mirror having good mechanical properties, the mirror comprising a cellular structure core with a stack of plies constituted by a polymerizable resin containing fibers being fixed on at least one face thereof, and a reflecting surface being formed on the stack, wherein the fibers in each ply extend in one direction only and wherein the orientations of the fibers in the various plies are at angles of $K\pi/n$, where K takes all of the integer values from 0 to $(n-1)$ once and once only, and where n is the number of plies, and wherein the last ply of the stack contain metallized fibers.

29. An ultralight-weight mirror according to claim 28 wherein the fibers are selected from the group constituted by fibers made of carbon, Kevlar, glass, ceramics, silica and boron.

* * * * *

UNITED STATES PATENT AND TRADEMARK OFFICE
CERTIFICATE OF CORRECTION

PATENT NO. : 4,842,398

DATED : June 27, 1989

INVENTOR(S) : Ducassou

It is certified that error appears in the above-identified patent and that said Letters Patent is hereby corrected as shown below:

Column 3

Line 36, delete "20" and substitute --1--.

Signed and Sealed this

Twentieth Day of March, 1990

Attest:

JEFFREY M. SAMUELS

Attesting Officer

Acting Commissioner of Patents and Trademarks